Oct. 6, 1925.

R. B. BENJAMIN

FIXTURE SUPPORTING DEVICE

Filed Nov. 4, 1921

1,555,821

Inventor:
Reuben B. Benjamin
By
Jones, Addington, Ames & Seibold
Attorneys.

Patented Oct. 6, 1925.

1,555,821

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

FIXTURE-SUPPORTING DEVICE.

Application filed November 4, 1921. Serial No. 512,767.

*To all whom it may concern:*

Be it known that I, REUBEN B. BENJAMIN, a citizen of the United States, residing at Chicago, in the county of Cook and State of Illinois, have invented new and useful Improvements in Fixture-Supporting Devices (case 502), of which the following is a full, clear, concise, and exact description, reference being had to the accompanying drawing, forming a part of this specification.

My invention relates to fixture supporting devices.

One of the objects of my invention is to provide improved means for so supporting a fixture that the fixture will be permitted to align itself by its own weight, and so that the fixture will be supported by shock-absorbing means, thus prolonging the life of the lamp filament and preventing undue strain on the stem and supporting means.

Further objects will appear from a detailed description to follow and from the appended claims.

In the drawings in which two embodiments of my invention are shown—

Figure 1:
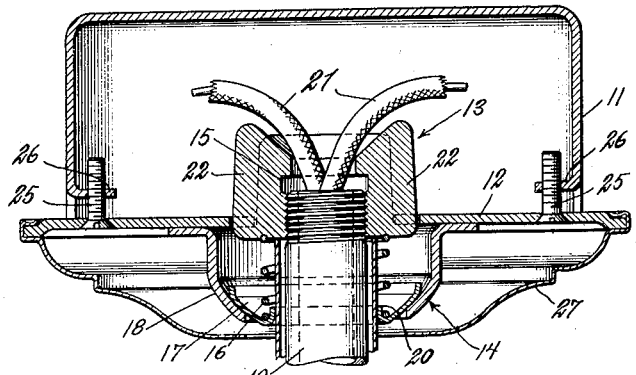
Figure 1 is a vertical axial section through an outlet box showing a fixture stem and supporting means.
Figure 2:
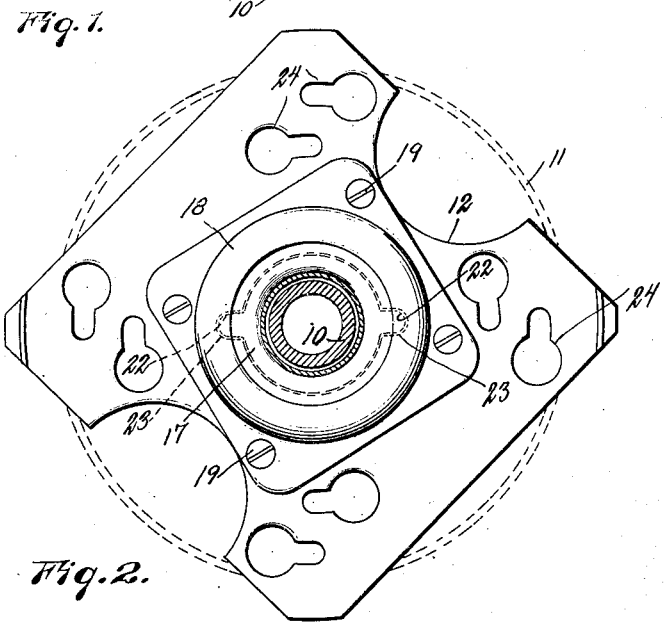
Fig. 2 is a bottom plan view of Fig. 1.

Referring first to Figs. 1 and 2, the construction shown therein comprises a fixture stem 10, an outlet box 11, an outlet box cover 12, and means 13 for yieldingly supporting the fixture stem 10 in position with respect to the outlet box 11, these means 13 being so constructed that the fixture stem 10 can align itself by gravity, thereby avoiding undue strain on the fixture stem and support.

The means 13 for supporting the stem comprise a sort of ball and socket support 14, a nut 15 threaded onto the upper end of the stem 10, and a coil compression spring 16 surrounding the stem 10, bearing at its lower end on one of the ball and socket members 17, and at its upper end on the nut 15.

The ball and socket mounting 14 comprises in addition to the member 17 already referred to a cup-shaped sheet metal member 18, secured to the outlet box cover 12 by means of screws 19. The inner ball and socket member 17 may also be formed of a sheet metal stamping, having an upturned flange 20 surrounding the stem 10, which flange is in turn surrounded by the lower coil of the compression spring 16.

In order to prevent accidental twisting of the stem 10 (which would cause twisting of the cord 21) the nut 15 is provided with a pair of wings 22 which engage notches 23 in the outlet box cover 12.

The engagement between the nut 15 and the plate 12 is purposely made somewhat free or loose to permit the nut to move easily in the openig in the plate 12 to permit the fixture stem 10 to align itself readily under the influence of gravity. The support thus not only yieldingly supports the lamp preventing injury to the lamp filament due to vibration, shocks, and etc., but also permits the fixture stem to align itself under the influence of gravity, thereby preventing undue strain on the fixture stem and the support.

In further explanation of the construction shown in the drawing, it is stated that the outlet box cover 12 is provided with a number of key-hole shaped openings 24 for cooperation with screws 25, screwed into ears 26 on the outlet box. Two sets of these openings are provided, so that the cover may be secured to different sizes of outlet boxes. An ornamental cover or canopy 27 is provided which may be secured to the outlet box 12 in any suitable manner.

Figure 3:
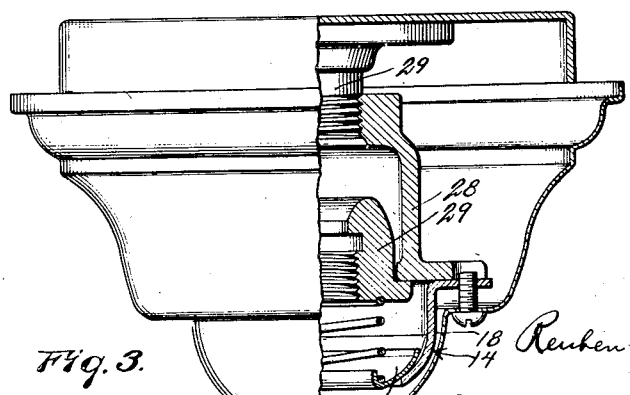
Fig. 3 is a part sectional, part elevational view showing another form.

The construction shown in Fig. 3 is similar to that just described, except that here the outer wall and socket member 18 is secured to a cup-shaped member 28, which in turn is screwed onto a nipple 29 mounted in the outlet box. In this form of my invention, the fixture stem extends up through the ball and socket member 17, and is threaded into the nut 29. Suitable interengaging means are provided between the nut 29 and cup-shaped member 28 to prevent relative rotation therebetween, thereby preventing rotation of the fixture stem and twisting of the cord.

In both forms of the invention shown, the strength of the spring is such that when the weight of the fixture is on it, the nut 15 will be pulled down to a position somewhat lower than that shown in the drawings, thereby enabling the stem to tilt readily to align itself under the influence of gravity.

Having thus described my invention, what I claim as new and desire to secure by Letters Patent of the United States is:

1. The combination with a fixture stem exteriorly threaded at its upper end of a nut into which the upper end of the stem is threaded, a housing for the upper end of the stem and the nut, and vertically yieldable means for supporting said fixture stem for limited universal movement comprising an annular support surrounding said stem and acting between said housing and nut, said nut and housing being provided with a tongue and groove to prevent relative rotation therebetween and to permit relative vertical movement therebetween.

2. The combination with a fixture stem, of longitudinally yieldable means for supporting said fixture stem for limited universal swinging movement comprising an annular support, and an annular member mounted for limited universal movement on said annular support, a shoulder member on said stem, and a coil spring acting between said annular member and shoulder, said annular support, annular member, and coil spring surrounding said stem, and means engaging said shoulder member to prevent rotation of said stem.

3. The combination with a fixture stem, of longitudinally yieldable means for supporting said fixture stem for limited universal swinging movement comprising an annular support, and an annular member mounted for limited universal movement on said annular support, a shoulder member on said stem, and a coil spring acting between said annular member and shoulder, said annular support, annular member, and coil spring surrounding said stem, and a plate on which said annular support is mounted provided with means engaging said shoulder member to prevent rotation of said stem.

In witness whereof, I have hereunto subscribed my name.

REUBEN B. BENJAMIN.